United States Patent Office 2,752,244
Patented June 26, 1956

2,752,244

METHOD AND COMPOUNDS FOR DISCHARGING FILTER DYES IN PHOTOGRAPHIC FILM

Joseph A. Sprung, Binghamton, N. Y., assignor to General Aniline & Film Corporation, New York, N. Y., a corporation of Delaware No Drawing. Application February 23, 1955, Serial No. 490,117

13 Claims. (Cl. 95—2)

The present invention relates to a method of discharging azo dye filter layers in photographic film, particularly while utilizing bleach compositions containing catalysts designed to accelerate such rate of discharge.

It is quite usual in the manufacture of multilayer color materials to locate in the layer arrangement a yellow filter designed to prevent blue light exposure of those layers sensitized to green and red. To this end, multilayer color materials are often produced by superimposing on a base a red, green and blue sensitive silver halide emulsion layer while interpolating between the blue and green layer a yellow filter layer. Furthermore, it is occasionally desirable to incorporate a red or magenta filter layer between the green and red sensitive layers in order to obtain better color separation.

Considerable work has been done toward providing adequate filter dyes for photographic materials and, from this work, it is understood that such dyes should fulfill the following prerequisites:

(a) Correct spectral characteristics;
(b) Non-diffusibility from the colloidal carrier of the filter layer;
(c) Non-desensitizing or non-fogging action on the adjacent silver halide emulsion layers;
(d) Non-interference with the step of color development, and
(e) Ready dischargeability with reagents which do not affect the color images.

It has been recognized that the filter dye problem would be ideally solved by the use of dyes capable of being discharged with those reagents necessarily employed in the processing of the light sensitive material. To this end, it has been suggested that there be used such agents as colloidal silver, bis-pyrazolones or dyes which are temporarily bound to the silver halide through sulfur or nitrogen linkages which split in the fixing baths. All of these proposals have been tried but it has been found that they have shortcomings which place restrictions on their general adoption.

It is reported in my U. S. Patent 2,564,238, granted August 14, 1951, that the rate of reduction of an azo linkage can be accelerated by means of catalysts which form reversible redox systems of specified redox potentials. By an extension of this theory, it was found that it was possible to discharge the non-diffusing azo dyes from filter layers within practical time limits and without destroying the azomethine and quinoneimine dye images produced on color development. Thus, it was observed that this result can be achieved by the use of an alkaline solution of a water soluble reducing agent, on the one hand, and a small amount of a catalyst for the reducing agent, particularly an N,N'-disubstituted-4,4'-bypyridylium salt, on the other hand.

The processing of photographic material to effect indiscriminate discharge of azo dye filter layers with such compositions, and such compositions, constitute the purposes and objects of the present invention.

The azo dyes, the discharge of which is contemplated, are any yellow or magenta azo dyes which are rendered fast to diffusion in the colloid in which the dye is located. In my U. S. Patent 2,629,658 I have suggested certain yellow and magenta azo dyes, fast to diffusion in colloids, for the manufacture of sensitive material for the silver azo dye bleachout process. These azo dyes are typified by the fact that they are derived by coupling a pyrazolone, on the one hand, or a naphthol, on the other hand, to a diazotized amine, the amine moiety containing a long aliphatic chain designed to prevent diffusion of the dye from the colloid in which it is located. It is indicated in this patent that the amines which are diazotized and coupled to produce the yellow and magenta dyes have the following constitution:

$$\text{Z}-\underset{\underset{\text{NH}_2}{|}}{\text{A}}-(\text{K}-\text{R})_{n-1}-\text{K}-\text{alk}$$

wherein Z is a conventional substituent, such as hydrogen; alkyl, i. e., methyl, ethyl, propyl, butyl and the like; alkoxy, such as methoxy, ethoxy and the like; sulfo; carboxy; halogen such as chlorine, bromine etc.; K is a homopolar linkage such as a carbonamide linkage, a sulfonamide linkage; a carbamyl linkage, a sulfamyl linkage or an ether linkage; alk represents an aliphatic chain of at least 8 carbon atoms; R is an aromatic radical, i. e., phenyl, toluyl and the like; $n$ equals 1 or 2, and A is a phenyl or aminodiphenyl radical.

The yellow and magenta azo dyes disclosed in this patent and particularly those having the following constitution:

Yellow

Magenta have been found to be exceedingly satisfactory as filter dyes for use in connection with my present bleaching system.

In my U. S. application, Serial No. 156,729, filed April 18, 1950, which also pertains to light sensitive material for the silver azo dye bleachout method, I have proposed that yellow and magenta azo dyes be made fast to diffusion in the emulsions by precipitation with guanidine compounds containing long aliphatic chains. The dyes described in this application, when made non-diffusible in this fashion and particularly the dyes of the following constitution:

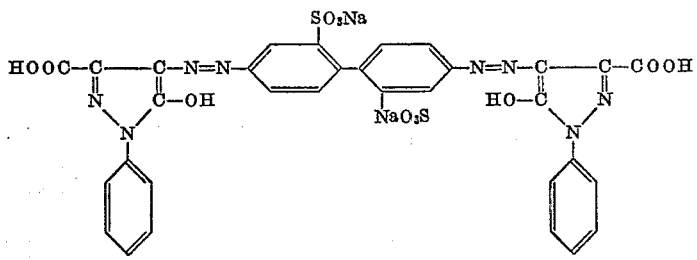

Yellow

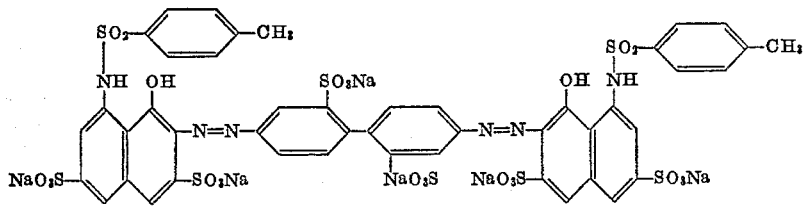

Magenta are also satisfactorily employed in connection with my bleaching system.

The bleaching compositions used to indiscriminately discharge the azo dye filter layers contain, as their essential components, a water soluble reducing agent, on the one hand, and an N,N'-dialkyl-4,4'-bipyridylium salt, on the other hand. The bipyridylium salt, as previously noted, catalyzes the reducing action so as to accelerate the indiscriminate discharge of the azo filter dye.

It is to be emphasized in this connection that, without the bipyridylium salt, a bleach period of fifteen minutes to one hour is required to adequately discharge the filter dye, whereas with the addition of catalytic amounts of the bipyridylium salt the dye is cleanly discharged within a period of from 1 to 5 minutes. The bleaching compositions containing these essential components should be on the alkaline side and, for this purpose, use may be made of conventional alkalies, such as sodium bicarbonate, sodium carbonate, borax, ammonium hydroxide or any other alkali of the type normally used in photographic processing.

Reducing agents which I have found to be particularly suitable are fairly strong agents, such as sodium hydrosulfite, sodium formaldehyde sulfoxylate, sodium stannite or aminoiminoemethanesulfinic acid of the following constitution:

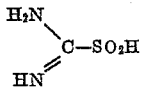

The reducing agent is usually employed in an amount of from about 1% to 5% by weight of the bleaching composition.

The bipyridylium compounds which are used have the following formula:

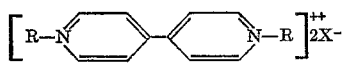

in which R is a lower aliphatic radical, such as methyl, ethyl, propyl, isopropyl, butyl, isobutyl, carboxymethyl, carboxyethyl and the like; or aralkyl, such as benzyl, and X is an anion of an acid, such as halide, i. e., chloride, bromide or the like, or a sulfate.

The bipyridylium compounds are derived from 4,4'-bipyridyl by quaternization through heating with two molecular equivalents of the appropriate alkyl halide or sulfate, such as methyl chloride, methyl sulfate, ethyl chloride, ethyl sulfate, benzyl chloride, butyl bromide, carboxymethyl chloride and the like. Such quaternization is standard procedure for preparing quaternary ammonium compounds as is evident from the following equation:

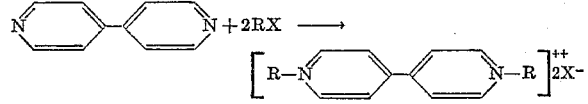

Such quaternization is used in preparing bipyridylium compounds by the method of Michaelis and Hill (J. A. C. S. 55, 1481 (1933), and J. Gen. Physiology, 16, 859–873 (1933)).

Typical bipyridylium compounds which are employed are N,N'-dimethyl-4,4'-bipyridylium chloride; N,N'-diethyl-4,4'-bipyridylium sulfate; N,N'-dibenzyl-4,4'-bypyridylium bromide; N,N'-dibutyl-4,4'-bipyridylium chloride; N,N'-dicarboxymethyl-4,4'-bipyridylium bromide and the like.

The amount of bipyridylium compound employed is not critical and may be varied over a range of from .005 to 0.1 gram per 100 cc. of the bleach solution. The quantity of the alkali employed, on the other hand, is that sufficient to give a pH on the alkaline side preferably ranging from 7.0 to 12.0.

A typical bleach solution found to be effective for my purpose is the following:

Reducing agent _____grams__ 1–5
Alkali (2–8% solution) _____cc__ 100
Bipyridylium compound _____grams__ .005–0.1

The dye discharge step has the tendency to reduce the azomethine and quinoneimine dye images to their leuco dye forms. It is a simple matter, however, to re-oxidize the leuco form to the original color without any appreciable color degradation.

It has been ascertained that the filter dye bleaching step with the above compounds may be carried out either after the color development step or after complete processing. If dye discharge directly succeeds color development, both the silver bleach and the dye image (conversion of leuco form to original form) restoration step may be carried out in the ferricyanide solution. On the other hand, if the alternate procedure be adopted, an additional oxidation step to effect dye image restoration is necessary. For negative color film in which the color formers are located in the emulsion layers, the alternate method is recommended for the reason that the dye discharge treatment may develop the residual silver halide with formation of some unremovable silver sulfide.

The invention will be further illustrated in the following examples, it being understood that the examples are not restrictive of the invention.

Example I

A multilayer color film was prepared by casting on a base and in super-position the following layers: a red sensitive silver halide emulsion layer containing a non-diffusing naphthol color former such as that described in Fiat final report No. 943, page 68; a colloidal filter layer of gelatin or the like containing a magenta azo dye of the type disclosed above, specifically that obtained by diazotizing 3-amino-4-octadecoxybenzene sulfonic acid and coupling the same with 1-hydroxy-8-benzoylamino naphthalene-3,6-disulfonic acid; a green sensitive silver halide emulsion layer containing a non-diffusing magenta color former, such as that described in Fiat final report No. 943, page 77; a colloidal filter layer of gelatin or the like containing a non-diffusing azo dye as suggested above, specifically that obtained by diazotizing 3-amino-octadecoxybenzene sulfonic acid and coupling the same with 1-(3'-sulfophenyl)-3-carbethoxy-5-pyrazolone; and a blue sensitive silver halide emulsion layer containing a non-diffusing yellow color former such as that described in Fiat final report No. 943, page 63. After exposure to a colored object, such color material is processed as follows:

Step 1.—Color development _____ 15' (20° C.)
    Water _____cc__ 750.0
    p-Diethylaminoaniline hydrochloride
        grams__ 2.75
    Hydroxylamine hydrochloride _____do____ 1.20
    Sodium sulfite (anhydrous) _____do____ 2.0
    Sodium carbonate (monohydrate) ___do____ 66.0
    Potassium bromide _____do____ 2.5
    Water to make 1000 cc.
Step 2.—Short stop _____ 1' (20° C.)
    Sodium bisulfite _____grams__ 50.0
    Water to make 1000 cc.
Step 3.—Harden _____ 4' (20° C.)
    Water _____cc__ 1000
    Potassium chrome alum _____grams__ 30.0
Step 4.—Wash _____ 10' (20° C.)
Step 5.—Silver bleach _____ 5' (20° C.)
    Water _____cc__ 750.0
    Potassium ferricyanide _____grams__ 60.0
    Potassium bromide _____do____ 15.0
    Dibasic sodium phosphate _____do____ 13.0
    Sodium bisulfate _____do____ 6.0
    Water to make 1000 cc.
Step 6.—Wash _____ 3' (20° C.)
Step 7.—Fix _____ 5' (20° C.)
    Water _____cc__ 1000
    Sodium thiosulfate _____grams__ 200
Step 8.—Wash _____ 5' (20° C.)
Step 9.—Filter dye discharge solution ____ 5' (20° C.)
    Sodium hydrosulfite _____grams__ 3.0
    Sodium bicarbonate (5%) _____cc__ 100.0
    N,N'-dimethyl-4,4'-bipyridylium chloride
        grams__ 0.1
Step 10.—Dye image restoration _____ 1' (20° C.)
    In ferricyanide bleach solution of step 5 above.
Step 11.—Wash _____ 5' (20° C.)

Example II

A material as described in Example I was subjected to reversal processing as follows:

Step 1.—Primary silver development _____12' (20° C.)
    Water _____cc__ 750.0
    Metol _____grams__ 3.0
    Sodium sulfite (anhydrous) _____do____ 50.0
    Sodium carbonate (monohydrate) ____do____ 40.0
    Sodium thiocyanate _____do____ 2.0
    Potassium bromide _____do____ 2.0
    Water to make 1000 cc.
Step 2.—Short stop_____3' (20° C.)
    Sodium bisulfite _____grams__ 50.0
    Water to make 1000 cc.
Step 3.—Wash _____1' (20° C.)
Step 4.—Second exposure.
Step 5.—Color development_____18' (20° C.)
    Water _____cc__ 750.0
    Sodium bisulfite _____grams__ 1.0
    p-Diethylaminoaniline hydrochloride__do____ 3.0
    Sodium carbonate (anhydrous) _____do____ 67.5
    Potassium bromide _____do____ 2.5
    Water to make 1000 cc.
Step 6.—Clearing bath_____3' (20° C.)
    Water _____cc__ 750.0
    Sodium bisulfite _____grams__ 10.0
    Sodium acetate _____do____ 30.0
    Water to make 1000 cc.
Step 7.—Harden _____5' (20° C.)
    Water _____cc__ 1000
    Potassium chrome alum _____grams__ 30.0
Step 8.—Wash _____5' (20° C.)
Step 9.—Filter dye discharge solution_____5' (20° C.)
Step 10.—Silver bleach and dye image
    restoration _____8' (20° C.)
    Water _____cc__ 750.0
    Potassium ferricyanide _____grams__ 60.0
    Potassium bromide _____do____ 15.0
    Dibasic sodium phosphate _____do____ 13.0
    Sodium bisulfate _____do____ 6.0
    Water to make 1000 cc.
Step 11.—Wash _____3' (20° C.)
Step 12.—Fix _____5' (20° C.)
    Water _____cc__ 1000
    Sodium thiosulfate _____grams__ 200
Step 13.—Wash _____15' (20° C.)

Example III

A material as described in Example I was exposed and subjected to reversal processing as follows:

Steps 1 to 8.
    Same as in Example II.
Step 9.—Silver bleach_____8' (20° C.)
    In ferricyanide bleach solution of step 10 of Example II.
Step 10.—Wash _____3' (20° C.)
Step 11.—Fix _____5' (20° C.)
Step 12.—Filter dye discharge solution_____5' (20° C.)
Step 13.—Dye image restoration_____1' (20° C.)
    In ferricyanide bleach solution of step 10 of Example II.
Step 14.—Wash _____15' (20° C.)

Example IV

The procedure is the same as in Example I, excepting that the filter dye discharge solution is constituted as follows:

Aminoiminomethane sulfinic acid_____grams__ 3.0
Sodium carbonate (5% solution)_____cc__ 100.0
N,N'-diethyl-4,4'-bipyridylium sulfate____grams__ 0.02

Example V

The procedure is the same as in Example II, excepting that the filter dye discharge solution was composed as follows:

Stannous chloride_____grams__ 1.0
Sodium hydroxide (6% solution)_____cc__ 100.0
N,N'-dibenzyl-4,4'-bipyridylium chloride__grams__ 0.01

It is understood that in this composition, the stannous chloride reacts with the caustic soda to form sodium stannite in situ.

Example VI

The procedure is the same as in Example I, excepting that the magenta filter layer was omitted.

In each of the above examples, the filter dye discharged indiscriminately and rapidly without deleteriously effecting the azomethine and quinoneimine dye images.

I claim:

1. In the processing of light sensitive photographic materials having a light sensitive silver halide emulsion and a filter containing a non-diffusing azo filter dyestuff by exposing and developing said light sensitive material and then indiscriminately discharging said dyestuff, the improvement which comprises effecting dye discharge by subjecting said developed material to the action of an aqueous alkaline discharge bath containing a strong reducing agent and as a catalyst a bipyridylium compound having the following constitution:

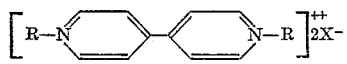

wherein R is selected from the class consisting of lower aliphatic radicals and aralkyl radicals, and X is an anion of an acid.

2. The process as defined in claim 1, wherein the reducing agent is selected from the class consisting of sodium hydrosulfite, sodium formaldehyde sulfoxylate, sodium stannite and aminoiminomethanesulfinic acid.

3. The process as defined in claim 1, wherein the filter dye is obtained by coupling a compound selected from the class consisting of pyrazolones and naphthols with a diazotized amine derived from an amine of the following formula:

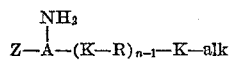

wherein Z is selected from the class consisting of hydrogen, alkyl, alkoxy, sulfo, carboxy and halogen, K is a homopolar linkage selected from the class consisting of a carbonamide linkage, a sulfonamide linkage, a carbamyl linkage, a sulfamyl linkage and an ether linkage, alk represents an aliphatic chain of at least 8 carbon atoms, R is an aromatic radical and A is selected from the class consisting of a phenyl and aminodiphenyl radical.

4. The process as defined in claim 1, wherein the azo dyestuff is rendered non-diffusing by precipitation with a compound selected from the class consisting of guanidine and biguanide compounds substituted by a group containing an aliphatic chain of at least 8 carbon atoms.

5. The process as defined in claim 1, wherein the bipyridylium compound is present in an amount of from .005 to 0.1 part by weight per 100 parts by volume of the discharge solution.

6. In the processing of a multilayer color material having superimposed silver halide emulsion layers, each layer being sensitized respectively to a primary color and having a filter layer interposed between the blue and green sensitive layers, said filter layer containing a non-diffusing yellow azo filter dyestuff, by exposing and color developing said multilayer material and then indiscriminately discharging said azo filter dyestuff, the improvement which comprisees effecting said dye discharge by subjecting said material to an aqueous alkaline discharge bath containing a strong reducing agent and as a catalyst a bipyridylium compound of the formula:

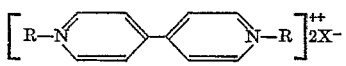

wherein R is selected from the class consisting of lower aliphatic radicals and aralkyl radicals, and X is an anion of an acid.

7. The process as defined in claim 6, wherein each silver halide emulsion layer contains a color former capable, on color development, of yielding a dyestuff complementary in color to that for which the layer is sensitized.

8. The process as defined in claim 6, wherein said multilayer color material is negative and the dye discharge succeeds complete processing and is followed by an oxidation step for the dye produced on color development.

9. The process as defined in claim 6, wherein the reducing agent is selected from the class consisting of sodium hydrosulfite, sodium formaldehyde sulfoxylate, sodium stannite and aminoiminomethanesulfinic acid.

10. The process as defined in claim 6, wherein the bipyridylium compound is present in an amount of from .005 to 0.1 part by weight per 100 parts by volume of the discharge solution.

11. Dye discharge solutions for non-diffusing azo dyestuffs comprising an aqueous alkaline solution of a strong reducing agent and as a catalyst a bipyridylium compound of the following formula:

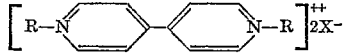

wherein R is selected from the class consisting of lower aliphatic radicals and aralkyl radicals, and X is an anion of an acid.

12. Compositions as defined in claim 11, wherein the reducing agent is selected from the class consisting of sodium hydrosulfite, sodium formaldehyde sulfoxylate, sodium stannite and aminoiminomethanesulfinic acid.

13. Compositions as defined in claim 11, wherein the bipyridylium compound is present in an amount ranging from .005 to 0.1 part by weight per 100 parts by volume of the solution.

No references cited.